United States Patent
Edwards et al.

(10) Patent No.: US 10,929,148 B2
(45) Date of Patent: Feb. 23, 2021

(54) EXECUTING SERVICES IN CONTAINERS

(71) Applicant: HEWLETT PACKARD ENTERPRISE DEVELOPMENT LP, Houston, TX (US)

(72) Inventors: Nigel Edwards, Bristol (GB); Chris I Dalton, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 16/307,922

(22) PCT Filed: Jun. 8, 2016

(86) PCT No.: PCT/US2016/036366
§ 371 (c)(1),
(2) Date: Dec. 6, 2018

(87) PCT Pub. No.: WO2017/213643
PCT Pub. Date: Dec. 14, 2017

(65) Prior Publication Data
US 2019/0220287 A1 Jul. 18, 2019

(51) Int. Cl.
*G06F 9/455* (2018.01)
*G06F 9/4401* (2018.01)
(Continued)

(52) U.S. Cl.
CPC ............ *G06F 9/4406* (2013.01); *G06F 9/44* (2013.01); *G06F 9/445* (2013.01);
(Continued)

(58) Field of Classification Search
CPC .... G06F 9/4406; G06F 9/45533; G06F 21/53; G06F 9/44; G06F 9/445; G06F 9/54; G06F 21/554; G06F 12/1009; G06F 9/545
See application file for complete search history.

(56) References Cited

U.S. PATENT DOCUMENTS 6,374,353 B1 4/2002 Atsushi et al.
8,209,704 B1 6/2012 McCann et al.
(Continued)

FOREIGN PATENT DOCUMENTS

CN 104573507 A 4/2015

OTHER PUBLICATIONS

Stavrou, et al. "A security architecture for information assurance and availability in MANETs". Published in: MILCOM IEEE Military Communications Conference (pp. 1-8) (Year: 2008).*
(Continued)

*Primary Examiner* — Adam Lee
(74) *Attorney, Agent, or Firm* — Hewlett Packard Enterprise Patent Department

(57) ABSTRACT

Example embodiments relate to executing services in containers. The examples disclosed herein include a computing device comprising instructions to load an inner portion of an operating system kernel in an inner region of a kernel space and an outer portion of the operating system kernel in an outer region of the kernel space. The example computing device may execute a service in a container in a user space. The container may be communicatively coupled with the outer region of the operating system kernel but divided from the inner portion of the operating system kernel.

13 Claims, 5 Drawing Sheets

(51) Int. Cl.
*G06F 9/54* (2006.01)
*G06F 9/445* (2018.01)
*G06F 9/44* (2018.01)
*G06F 21/53* (2013.01)
*G06F 12/1009* (2016.01)
*G06F 21/55* (2013.01)

(52) U.S. Cl.
CPC ............ *G06F 9/45533* (2013.01); *G06F 9/54* (2013.01); *G06F 9/545* (2013.01); *G06F 12/1009* (2013.01); *G06F 21/53* (2013.01); *G06F 21/554* (2013.01)

(56) References Cited

U.S. PATENT DOCUMENTS

| | | | |
|---|---|---|---|
| 8,578,483 | B2 | 11/2013 | Seshadri et al. |
| 8,914,785 | B2 | 12/2014 | Buswell |
| 9,778,944 | B1* | 10/2017 | Madasamy .......... G06F 9/45533 |
| 9,794,275 | B1* | 10/2017 | Benameur ........... H04L 63/1416 |
| 10,146,936 | B1* | 12/2018 | Khanduja ............. G06F 21/552 |
| 2005/0251637 | A1 | 11/2005 | Marinescu et al. |
| 2010/0031360 | A1* | 2/2010 | Seshadri ................. G06F 21/57 726/24 |
| 2012/0017213 | A1* | 1/2012 | Hunt ....................... G06F 21/53 718/100 |
| 2014/0033189 | A1 | 1/2014 | Buswell |
| 2014/0075555 | A1 | 3/2014 | Shilimkar |
| 2014/0194094 | A1* | 7/2014 | Ahuja ................... H04W 4/029 455/410 |
| 2014/0380009 | A1* | 12/2014 | Lemay ................ G06F 9/45558 711/163 |
| 2015/0150003 | A1 | 5/2015 | Emelyanov et al. |
| 2015/0178497 | A1 | 6/2015 | Lukacs et al. |
| 2015/0277856 | A1* | 10/2015 | Payne ....................... G06F 7/58 708/255 |
| 2016/0212012 | A1* | 7/2016 | Young ................. G06F 9/45558 |
| 2016/0378545 | A1* | 12/2016 | Ho ............................ G06F 9/46 718/107 |
| 2017/0116042 | A1* | 4/2017 | Xu ....................... G06F 9/45558 |
| 2017/0364685 | A1* | 12/2017 | Shah ........................ G06F 21/53 |
| 2018/0189479 | A1* | 7/2018 | Dam ........................ G06N 5/003 |

OTHER PUBLICATIONS

Docker, "Biild, Ship, Run", available online at <https://web.archive.org/web/20160319233127/https://www.docker.com/>, Mar. 19, 2016, 9 pages.
Hund et al., "Return-Oriented Rootkits: Bypassing Kernel Code Integrity Protection Mechanisms", 2009, 16 pages.
Kemerlis et al., "ret2dir: Rethinking Kernel Isolation", 23rd USENIX Security Symposium, 2014, pp. 957-972.
Linux Kernel, "CVE Details", available online at <https://web.archive.org/web/20160304183337/http://www.cvedetails.com/product/47/linux-linux-kernel.html vendor_id=33>, Mar. 4, 2016, 2 pages.
Simon Sharwood, "VMware hypervisor escape via serial port? VMware hypervisor escape via serial port", available online agt <https://www.theregister.co.uk/2015/06/09/vmware_patches_dos_and_code_execution_flaws/>, Jun. 9, 2015, 6 pages.
Adam Belay et al,, "Dune: Safe User-level Access to Privileged CPU Features," 2012, pp. 335-348, USENIX Association.
David Kaplan et al., "AMD Memory Encryption," White Paper, Apr. 21, 2016, pp, 1-12, Advanced Micro Devices, Inc.
Extended European Search Report, EP Application No. 16904792.5, dated May 29, 2018, pp. 1-12, EPO.
Haogang Chen et al., "Linux Kernel Vulnerabilities: State-of-the-art Defenses and Open Problems," Jun. 28, 2011, pp. 1-5, ACM.
International Search Report and Written Opinion, International Application No. PCT/US2016/036366, dated Mar, 2, 2017, pp, 1-12, KIPO.
Major Hayden, "Securing Linux Containers," Jul. 26, 2015, pp. 1-24, The SANS Institute.
Mathijs Jeroen Scheepers, "Virtualization and Containerization of Application Infrastructure: A Comparison," Jun. 23, 2014, pp. 1-7, University of Twente, The Netherlands.
Nathan Dautenhahn et al,, "Nested Kernel: An Operating System Architecture for Intra-Kernel Privilege Separation," Mar. 2015, pp. 1-16, ACM.
Neel Natu and Peter Grehan, "Nested Paging in bhyve," Feb. 8, 2014, pp. 1-10, The FreeBSD Project.

* cited by examiner

EXECUTING SERVICES IN CONTAINERS

BACKGROUND

Containers are paradigms for developing and deploying computer services. Developers and operators value containers because dependencies for running a service are encapsulated inside a single entity.

BRIEF DESCRIPTION OF THE DRAWINGS

The following detailed description references the drawings, wherein.

DETAILED DESCRIPTION

Figure 1:
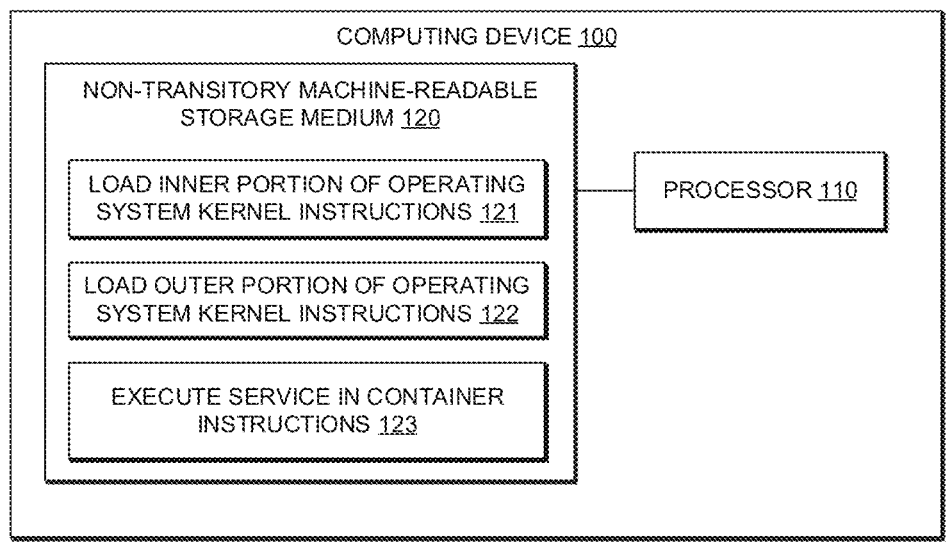
FIG. 1 is a block diagram of an example computing device for executing services in containers.

Containers are paradigms for developing and deploying computer services. Developers and operators value containers because dependencies for running a service are encapsulated inside a single entity. This makes it easy to transport a service from a development environment to an operating environment. Furthermore, multiple containers may share a physical machine without conflict because differences in libraries and configuration may be encapsulated within each container. Containers may efficiently utilize resources and may be easier to manage than virtual machines because there may be a single operating system per physical machine. Thus, a container-based system may involve fewer operating systems for an administrator to manage and fewer redundant processes since there is only a single kernel per machine and a single set of operating system services (daemons).

Because container-based systems rely on multiple mechanisms spread throughout a kernel of an operating system including a single kernel and multiple processes executing in multiple containers running on the kernel, it may be challenging to verify and maintain the integrity of these mechanisms. For example, a single bug in just one of the mechanisms may compromise some or all of the containers since multiple containers may access the same file systems, memory, storage, and/or other mechanisms. Memory corruption vulnerabilities are typically targeted by attackers to take over a kernel. For example, an attacker may overwrite a significant data structure, typically a function pointer, to exploit a memory corruption bug. The function pointer may then be updated to point to attacker-provided code. When the kernel follows the function pointer, it may be tricked into executing the attacker-provided code, which may provide the attacker unwanted access or control over the kernel. The attacker may then be able to monitor and interfere with processes running on the system and memory on the system, which may compromise other containers running on the system.

A current solution for protecting against such kernel compromises is to run containers in separate virtual machines. This provides protection because each virtual machine has its own kernel, so a kernel on one virtual machine can be isolated from kernels of other virtual machines. However, each virtual machine may have its own kernel and its own operating system services. Such an arrangement can create significant overhead because it could require additional processor, memory, and storage resources. Furthermore, system administrators may have to manage multiple operating system instances and various resources in addition to managing the container, the virtual machine, and the interaction therebetween. This defeats the initial rationale behind using containers.

Examples disclosed herein address these technical challenges by providing an efficient and secure architecture for executing services in containers. An example computing device may load an inner portion of an operating system kernel in an inner region of a kernel space and an outer portion of the operating system kernel in an outer region of the kernel space. A service may be executed in a container in a user space, where the container is communicatively coupled with the outer region of the operating system kernel and is divided from the inner region of the operating system kernel. In this manner, examples herein provide protection against kernel flaws and prevents containers from breaking out of isolation mechanisms and compromising the system.

Referring now to the drawings, FIG. 1 depicts an example computing device 100 for executing services in containers. Computing device 100 may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. In the example shown in FIG. 1, computing device 100 includes a processor 110 and a non-transitory machine-readable storage medium 120 encoded with instructions to execute services in containers.

Processor 110 may be one or more central processing units (CPUs), semiconductor-based microprocessors, and/or other hardware devices suitable for retrieval and execution of instructions stored in machine-readable storage medium 120. Processor 110 may fetch, decode, and execute instructions 121, 122, 123, and/or other instructions to implement the procedures described herein. As an alternative or in addition to retrieving and executing instructions, processor 110 may include one or more electronic circuits that include electronic components for performing the functionality of one or more of instructions 121, 122, and 123.

In an example, the program instructions 121, 122, 123, and/or other instructions can be part of an installation package that can be executed by processor 110 to implement the functionality described herein. In such a case, memory 120 may be a portable medium such as a CD, DVD, or flash drive or a memory maintained by a computing device from which the installation package can be downloaded and installed. In another example, the program instructions may be part of an application or applications already installed on computing device 100.

Machine-readable storage medium 120 may be any electronic, magnetic, optical, or other physical storage device that contains or stores executable data accessible to computing device 100. Thus, machine-readable storage medium 120 may be, for example, a Random Access Memory (RAM), an Electrically Erasable Programmable Read-Only Memory (EEPROM), a storage device, an optical disc, and the like. Storage medium 120 may be a non-transitory storage medium, where the term "non-transitory" does not encompass transitory propagating signals. Storage medium 120 may be located in computing device 100 and/or in another device in communication with computing device 100. As described in detail below, machine-readable storage medium 120 may be encoded with load inner portion of operating system kernel instructions 121, load outer portion of operating system kernel instructions 122, and execute service in container instructions 123.

Instructions 121, responsive to being executed by processor 110, may load an inner portion of an operating system kernel in an inner region of a kernel space. Instructions 122, responsive to being executed by processor 110, may load an outer portion of the operating system kernel in an outer region of the kernel space. An operating system kernel may be a computer program that constitutes the central core of the operating system of computing device 100. The operating system kernel may control processes, programs, and functions being executed by computing device 100. The operating system kernel may manage the processing of instructions, memory operations, as well as communications with other components.

A kernel space may be a part of a virtual memory of computing device 100. The virtual memory may map virtual addresses of a program into physical addresses in computer memory of computing device 100, such as storage medium 120 or other memory device. Processor 110 of computing device 100 may segregate the virtual memory of the computing device into the kernel space and a user space. For example, the kernel space may be reserved for running the operating system kernel, kernel extensions, and device drivers. The user space, in contrast, may be the memory area where applications and services are executed.

Furthermore, the kernel space may be divided into an inner region and an outer region. The inner portion of the operating system kernel may be loaded in the inner region, and the outer portion of the operating system kernel may be loaded in the outer region. The inner portion may, in some examples, have direct unfettered access to the hardware of computing device 100. In contrast, a virtual memory interface may be presented to the outer portion, which may not have direct access to privileged portions of the hardware, such as a memory management unit. The security goals of the kernel division are integrity guarantees for kernel code and critical data along with kernel control flow integrity, and information flow control enforcement across processes within the operating system kernel.

For example, the inner portion of the operating system kernel may include a memory management unit, a process management unit, and architecture specific code. The memory management unit may be a hardware unit that manages virtual memory and performs translation of virtual memory addresses to physical memory addresses. The process management unit may manage the data structures for processes running on the operating system. The architecture specific code may be custom instructions that modify an existing operating system kernel to implement an example kernel architecture described herein. The inner kernel may manage communication with the outer portion of the kernel by providing a restricted API which may be accessible to any outer kernel component.

In some examples, the outer portion of the operating system kernel may include all other components of the operating system kernel not included in the inner portion. For example, the outer portion may include a file systems unit and a device driver unit. The file systems unit may provide an abstraction of files to user space programs. For example, the file systems unit may communicate with other outer kernel components including the device driver unit. The device driver unit may provide interfaces for hardware devices, which may enable the operating system to access hardware functions.

In some examples, the kernel space may be divided into the inner region, which loads the inner portion of the operating system kernel, and the outer region, which loads the outer portion of the operating system kernel, by nested page tables. The inner portion of the kernel may be mapped in an inner page table, which may have controlled access from the outer portion of the kernel and any processes running on the outer portion of the kernel. For example, the inner portion may be inaccessible, read-only, or a combination of both. The outer portion, on the other hand, may be mapped in an outer page table, which may map directly to physical memory, but the nested structure of the inner page table and the outer page table controls the access to the inner portion of the kernel. As a result, in some examples, an attempt to write the inner portion of the kernel by the outer portion of the kernel may cause a violation if the access is read-only or inaccessible. Furthermore, the mapping from the outer page table to physical memory may be controlled by the inner portion of the kernel through the inner page table. The mapping of the outer portion of the kernel and its processes' virtual memory to physical memory may thus be under the complete control of the inner portion of the kernel.

It should be noted that the inner portion of the operating system kernel and the outer portion of the operating system kernel may, in some examples, be loaded initially as a single kernel image. The processes of the kernel may then be dynamically transitioned into their respective portions. The entire kernel may share the same code base but attempts to access privileged functionality, such as those restricted to the inner portion of the kernel, from the outer portion of the kernel may cause a violation.

Continuing to refer to FIG. 1, instructions 123, responsive to being executed by processor 110, may execute a service in a container in a user space. The container may be an isolated user space instance, in which processes are executed. The user space may be the memory area of the operating system of computing device 100 where application processes are executed. The container may be communicatively coupled to the outer portion of the operating system kernel, and the container may be divided from the inner portion of the operating kernel. In some examples, the container may include the outer portion of the kernel, and the combined structure is considered the container. The service being executed in the container may be any program, application, or process that can be virtualized in the container.

As described in further detail in relation to FIG. 2 below, a single operating system kernel may include an inner portion and a plurality of outer portions sharing the same base code. Each of the outer portions may be able to facilitate a container in which a service is executed. By loading a plurality of outer portions, computing device 100 running one operating system kernel may facilitate multiple container instances, where each container is isolated from each other.

Figure 3:
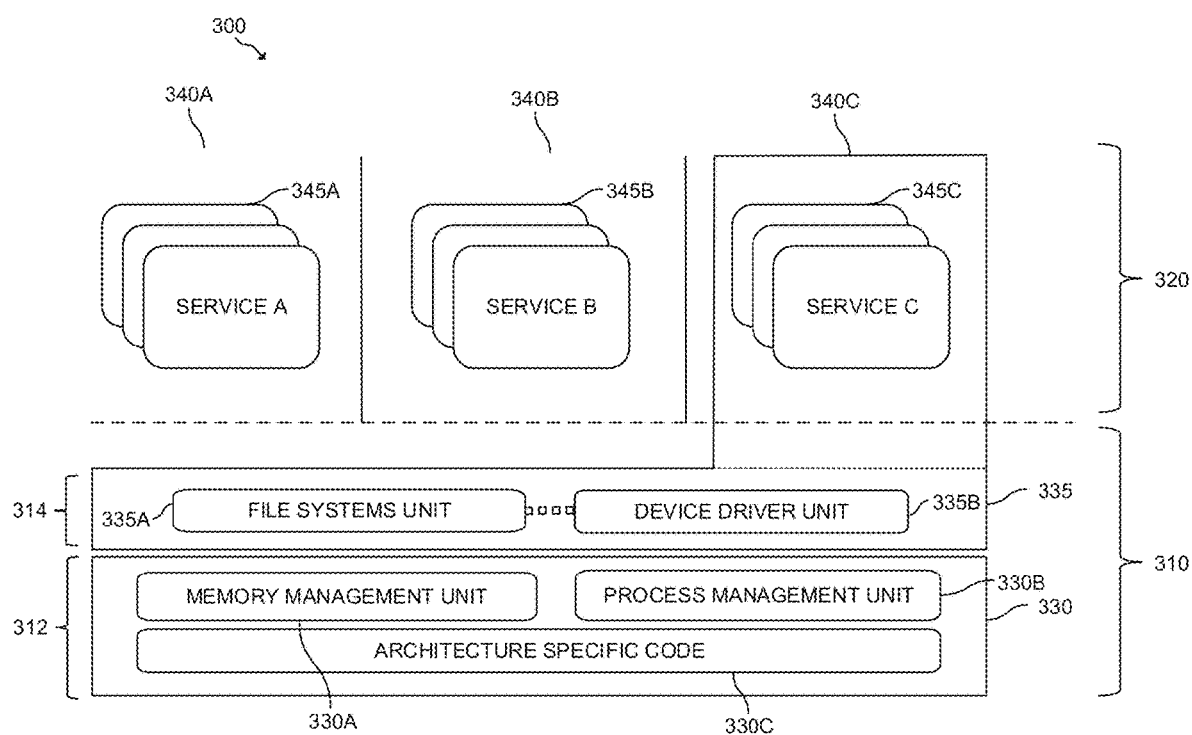
FIG. 3 is a block diagram of an example system for executing services in containers.

FIG. 3 provides an illustrative example of the architecture described herein. FIG. 3 is a block diagram of a system 300 for executing services in containers. For example, system 300 may be implemented as computing device 100, but may also be a system of multiple devices connected through a network, such as the cloud. System 300 may include a kernel space 310 and a user space 320. An inner portion 330 of an operating system kernel may be loaded in an inner region 312 of the kernel space 310. An outer portion 335 of the operating system kernel may be loaded in an outer region 314 of kernel space 310. As described above, the inner region 312 may be divided from the outer region 314 by nested page tables. As an example, inner portion 330 of the operating system kernel may include a memory management unit 330A, a process management unit 330B, and architecture specific code 330C. Similarly, outer portion 335 may include a file systems unit 335A and a device driver unit 335B.

In the user space 320, a service 345C may be executed in a container 340C. As illustrated, container 340C may be communicatively coupled to outer portion 335 of the kernel. It may also be understood that the combination of service 345C and outer portion 335 as a whole may represent container 340C. Container 340C is divided from inner portion 330 of the operating system kernel.

Referring back now to FIG. 2, FIG. 2 depicts a non-transitory machine-readable storage medium 200 of an example computing device for executing services in containers. The example computing device may be computing device 100 or FIG. 1 or a second computing device. The example device may be, for example, a cloud server, a local area network server, a web server, a mainframe, a mobile computing device, a notebook or desktop computer, a smart TV, a point-of-sale device, a wearable device, any other suitable electronic device, or a combination of devices, such as ones connected by a cloud or internet network, that perform the functions described herein. Non-transitory machine-readable storage medium 200 may be encoded with instructions to execute a service in a container.

The example computing device may also include a processor, which may be one or more central processing units (CPUs), semiconductor-based microprocessors, and/or other hardware devices suitable for retrieval and execution of instructions stored in machine-readable storage medium 200. The processor may fetch, decode, and execute instructions 210, 220, 230, 240, and/or other instructions to implement the procedures described herein.

Load inner portion of operating system kernel instructions 210 may be analogous to instructions 121 of computing device 100, and may load an inner portion of an operating system kernel in an inner region of a kernel space. Outer portion of operating system kernel instructions 220 may be analogous to instructions 122 of computing device 100. Furthermore, instructions 220 may include load outer portion instructions 221 and load second outer portion instructions 222. Instructions 221 and instructions 222 may respectively load an outer portion and a second outer portion of the operating system kernel in an outer region of the kernel space.

As mentioned above, multiple outer portions of the operating system kernel may be loaded with a single inner portion of the kernel. In the example of FIG. 2, the outer portion of the kernel and the second outer portion of the kernel may each have its own outer page tables. For example, the outer portion and the second outer portion may share memory, and may be marked copy on write. If one of the outer portions attempts to update a section of memory marked copy on write, the operating system kernel, via a memory management unit loaded in the inner portion of the kernel, may allocate a new piece of physical memory for that outer portion of the kernel so that it is writing to its own private copy and has no effect on the other outer portions of the kernel.

Figure 2:
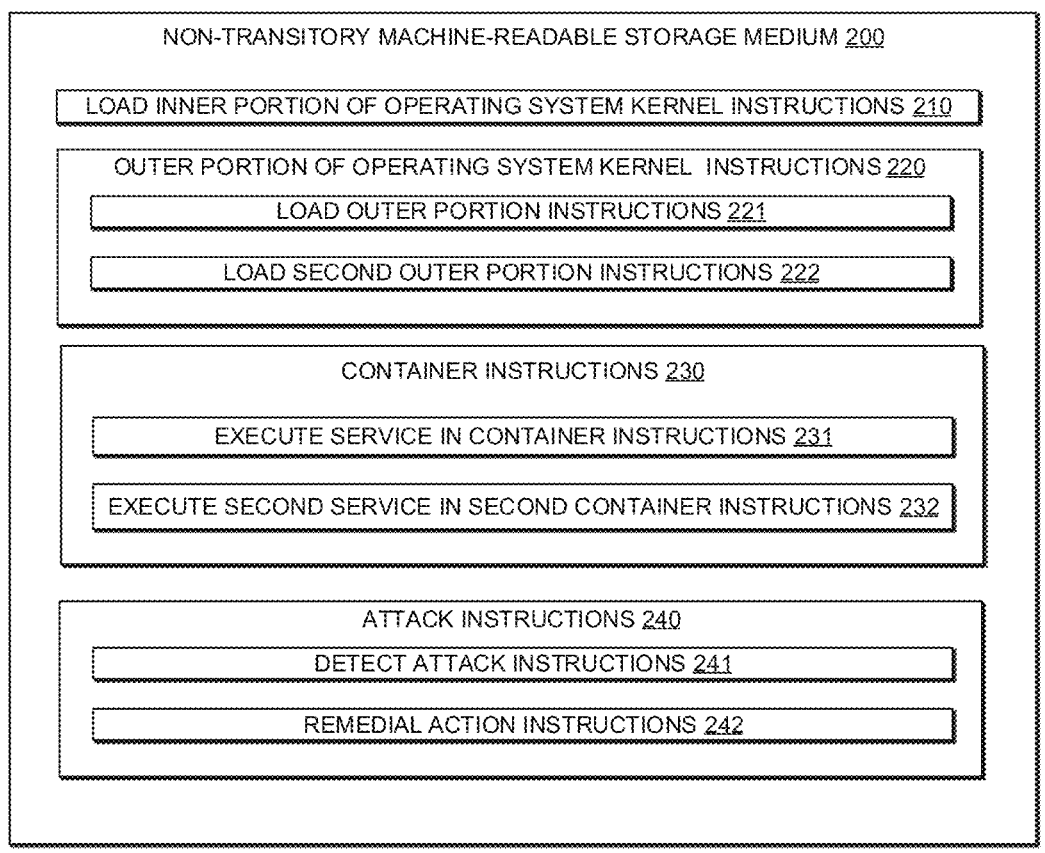
FIG. 2 is a block diagram of a non-transitory machine-readable storage medium of an example computing device for executing services in containers.

Continuing to refer to FIG. 2, container instructions 230 may be analogous to instructions 123 of computing device 100. Furthermore, instructions 230 may include execute service in container instructions 231 and execute second service in second container instructions 232. Instructions 231 may execute a service in a container in a user space, where the container may be communicatively coupled to the outer portion of the operating system kernel, and the container may be divided from the inner portion of the operating kernel. Instructions 232 may execute a second service in a second container in the user space, where the second container may be communicatively coupled to the second outer portion of the operating system kernel, and the second container may be divided from the inner portion of the operating kernel.

FIG. 3 provides an illustrative example of the architecture implemented by the example computing device of FIG. 2. For example, instructions 210 may load inner portion 330 of an operating system kernel in an inner region 312 of a kernel space 310. Instructions 221 may load an outer portion 335 of the operating system kernel in an outer region 314 of the kernel space 310. Instructions 231 may execute a service 345C in a container 340C communicatively coupled to the outer portion 335 of the operating system kernel. Furthermore, instructions 222 may load a second outer portion of the operating system kernel in the outer region 314 of the kernel space 310. The second outer portion of the operating system kernel may include the same physical memory as the outer portion 335 and may include the same units and processes. A second container, such as container 340B may allow execution of a second service 345B. Second container 340B may be communicatively coupled with the second outer portion of the operating system kernel and may be divided from the inner portion 330.

In some examples, container 340C and second container 340B may be isolated from each other. In the example illustrated in FIG. 3, system 300 may also include a third container 340A, which may also be isolated from the other containers. The containers may be isolated by the use of address spaces. For example, each container may comprise an isolated address space. For example, multiple containers may map to the same base code, but are marked copy on write. If a process of a container attempt to update a section of memory marked copy on write, the operating system kernel, via a memory management unit loaded in the inner portion of the kernel, may allocate a new piece of physical memory for a corresponding outer portion of the kernel so that the process is writing to its own private copy and has no effect on the other containers.

Referring back to FIG. 2, attack instructions 240 may include detect attack instructions 241 and remedial action instructions 242. Detect attack instructions 241, responsive to being executed by a processor, may detect an attack on a container, a service, or an outer portion of an operating system kernel. An attack may be any attempt to destroy, expose, alter, disable, steal, compromise, or otherwise gain unauthorized access or use of a computing asset. Detect attack instructions 241 may, for example, detect attacks on the container architecture itself, on the processes running in the containers, or on the outer portion of the operating system kernel.

Remedial action instructions 242, responsive to being executed by a processor, may take remedial action on the attacked container, service, or outer portion of the operating system kernel. For example, the remedial action may only be taken on the unit of the system that is targeted and affected by the attack. A remedial action on the attack may include identifying malicious activity, logging information about this activity, attempting to stop it, reporting it, and/or action to respond to the attack. In such a manner, the second container, the second service, and the second outer portion of the operating system kernel are unaffected.

Figure 4:
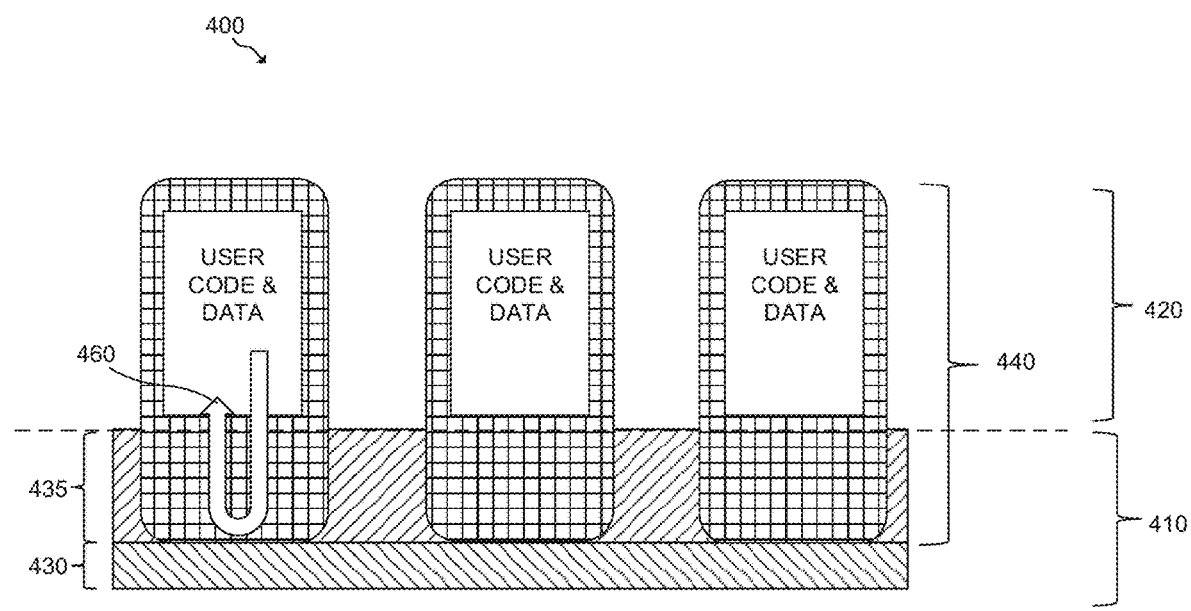
FIG. 4 is a block diagram of an example system for executing services in containers illustrating multiple containers in the system.

FIG. 4 provides an illustrative example of the isolation mechanisms of the architecture described herein and the operations of attack instructions 240 of storage medium 200. FIG. 4 depicts a system 400 for executing services in containers illustrating multiple containers in the system. For example, system 400 may be implemented as computing device 200, but may also be a system of multiple devices connected through a network, such as the cloud. System 400 may include a kernel space 410 and a user space 420. An inner portion 430 of an operating system kernel may be loaded in an inner region of the kernel space 410. A plurality of outer portions 435 of the operating system kernel may be loaded in an outer region of kernel space 410.

A plurality of containers 440 may facilitate the executing of a plurality of services. For example, a service may be executed in each container 440 in the user space 420. Each container 440 may include an outer portion of the operating system kernel and a service in the user space. The container 440 may also include user code and data. Each container 440 may include the same base code, which may be marked copy on write. As a result, an attempt to change the kernel memory may result in a new copy of the physical memory being created to account for the change.

In some examples such as those described herein, any attempt 460 by a container 440 to access physical memory not in its page table or with the wrong permission or to inject unauthorized code from the user space 420 into the kernel space 410 may trap into the inner portion of the operating system kernel 430 because the user space 420 and outer region of the kernel space may have separate upper level page tables for each container 440. So the processor may enforce isolation between user space processes and data from separate containers as it is processed by the operating system kernel. Memory for outer regions of the kernel space may be immutable within a container, and only changeable within the inner region of the kernel space.

Furthermore, in some examples where the memory is marked copy on write, an update to a function pointer during an attack will be made within the outer portion 435 of the operating system kernel in which the attacker is running, but not to any other outer portions of the operating system kernel. Therefore the integrity of other outer portions may be unaffected. So far as is possible, any sensitive kernel data structures, such as those controlling process privilege, may be read-only in the outer portions of the operating system kernel.

The above means that an attacker may not be able to monitor or change the memory of any other process or container on the system that is using a different outer portion of the operating system kernel. The physical memory may be inaccessible to the outer portions of the operating system kernel because of nested page tables. Attempts to access this memory may cause a trap as described above, so an attack will be detected and can be remediated. Similarly any attempt to update memory which is read-only to the outer region of the kernel space to escalate privilege or similar will be detected via a trap and the attack can be remediated.

Figure 5:
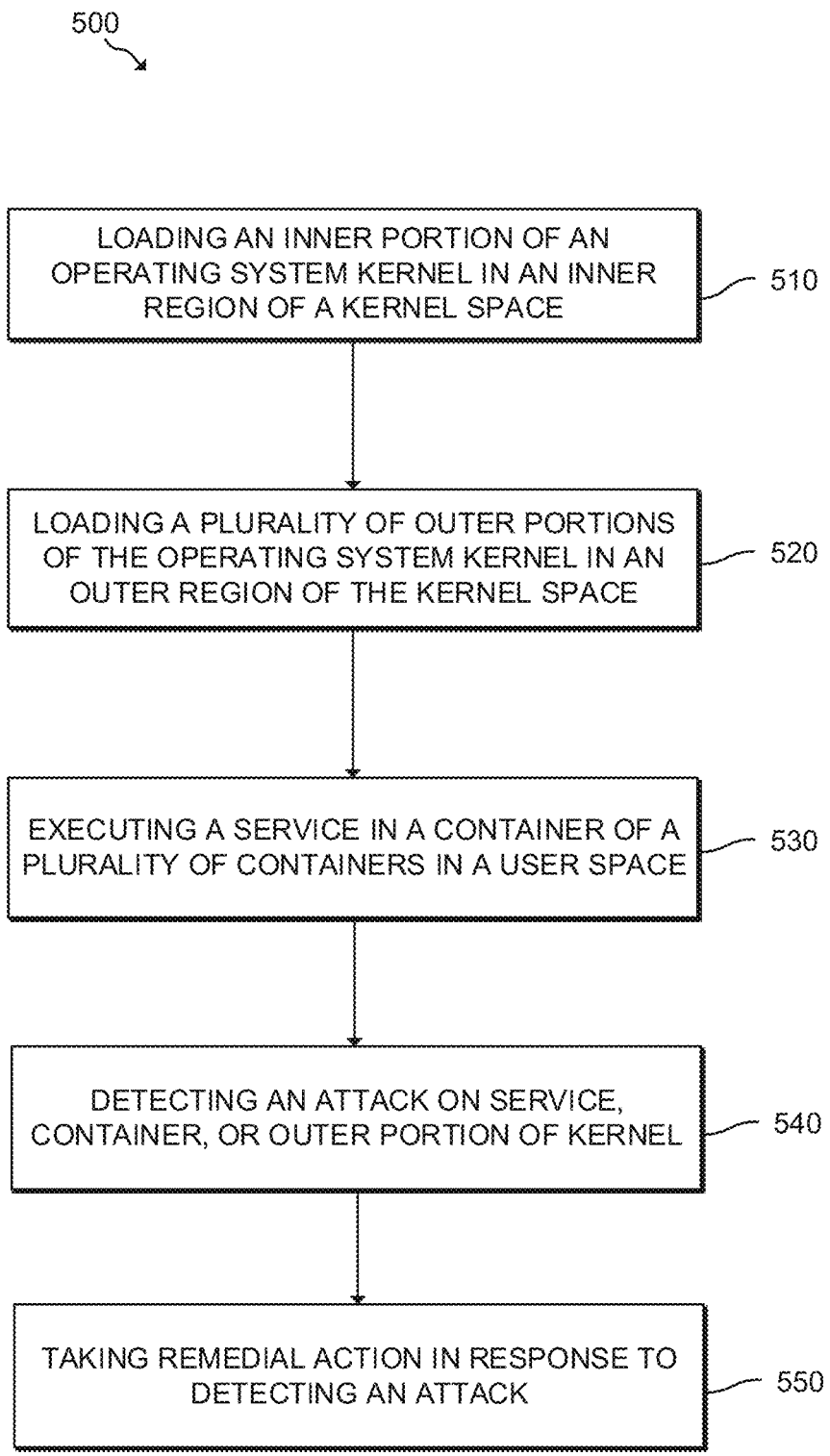
FIG. 5 is a flowchart of an example method for executing services in containers.

Referring now to FIG. 5, example method 500 illustrates executing services in containers. Although execution of method 500 is described below with reference to the examples illustrated in FIGS. 2, 3, and 4, other suitable devices for execution of this method should be apparent, including the examples of FIG. 1. Method 500 may be implemented in the form of executable instructions stored on a machine-readable storage medium and/or in the form of electronic circuitry.

In an operation 510, an inner portion of an operating system kernel may be loaded in an inner region of a kernel space. For example, instructions 210 of the computing device of FIG. 2 may load an inner portion 330 of an operating system kernel in an inner region 312 of a kernel space 310 in the system 300 of FIG. 3. As described previously herein, the inner portion may, in some examples, have direct unfettered access to the hardware of computing device 100. In some examples, the inner portion of the operating system kernel may include a memory management unit, a process management unit, and architecture specific code.

In an operation 520, a plurality of outer portions of the operating system kernel may be loaded in an outer region of the kernel space. For example, instructions 221 of the computing device of FIG. 2 may load an outer portion 335 of an operating system kernel in an outer region 314 of the kernel space 310 in the system 300 of FIG. 3. Instructions 222 of the computing device of FIG. 2 may also load a second outer portion of an operating system kernel in the inner region 312 of the kernel space 310. Each outer portion of the operating system kernel may include all other components of the operating system kernel not included in the inner portion, and each outer portion may facilitate a separate container for executing services.

In an operation 530, a service may be executed in a container of a plurality containers in a user space. For example, instructions 231 of the computing device of FIG. 2 may execute a service 345C in a container 340C in a user space 320 in the system 300 of FIG. 3. The container may be communicatively coupled to the outer portion of the operating system kernel, and the container may be divided from the inner portion of the operating kernel. In some examples, the container may include the outer portion of the kernel. The service being executed in the container may be any program, application, or process that can be virtualized in the container.

In an operation 540, an attack on the container, the service, or the outer portion of the operating system kernel may be detected. For example, instructions 241 of the computing device of FIG. 2 may detect an attack on service 345C, container 340C, or outer portion 335 of the operating system kernel in the system 300 of FIG. 3. As explained previously, an attack may be any attempt to destroy, expose, alter, disable, steal, compromise, or otherwise gain unauthorized access or use of a computing asset. For example, an attack may be detected on the container architecture itself, on the processes running in the containers, or on the outer portion of the operating system kernel.

In an operation 550, take remedial action may be taken on the attacked container, service, or outer portion of the operating system kernel in response to detecting an attack in operation 540. For example, instructions 242 of the computing device of FIG. 2 may take remedial action on service 345C, container 340C, or outer portion 335 of the operating system kernel in the system 300 of FIG. 3. A remedial action on the attack may include identifying malicious activity, logging information about this activity, attempting to stop it, and/or reporting it. As illustrated in FIG. 4, an attack 460 on container 440, a service running in container 440, or outer portion 435 of the kernel associated with container 440 may be detected. An remedial action may be taken on the attacked component, which is isolated within container 440 and does not affect inner portion 430 of the kernel or other containers in the system.

The foregoing disclosure describes a number of example embodiments for executing services in containers. The disclosed examples may include systems, devices, computer-readable storage media, and methods for execution of services in containers. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A computing device, comprising a processor and a non-transitory machine-readable storage medium encoded with instructions executable by the processor, the non-transitory storage medium comprising instructions to:
load an inner portion of an operating system kernel in an inner region of a kernel space, wherein the inner portion has direct access to hardware of the computing device;
load an outer portion of the operating system kernel in an outer region of the kernel space, wherein the outer portion includes other components of the operating system kernel not included in the inner portion;
execute a service in a container in a user space, wherein the container is communicatively coupled with the outer portion of the operating system kernel, and wherein the container is divided from the inner portion of the operating system kernel; and
in response to detecting an attack on the container, the service, or the outer portion of the operating system kernel, take remedial action on the attacked container, service, or outer portion of the operating system kernel, wherein other containers, services, and outer portions of the operating system kernel are unaffected by the remedial action.

2. The computing device of claim 1, wherein the non-transitory storage medium further comprises instructions to:
load a second outer portion of the operating system kernel in the outer region of the kernel space; and
execute a second service in a second container in the user space, wherein the second container is communicatively coupled with the second outer portion of the operating system kernel, and wherein the second container is divided from the inner portion of the operating system kernel.

3. The computing device of claim 2, wherein the container is isolated from the second container.

4. The computing device of claim 1, wherein the inner portion of the operating system kernel comprises a memory management unit, a process management unit, and architecture specific code.

5. The computing device of claim 1, wherein the container and the second container each comprises an isolated address space.

6. The computing device of claim 1, wherein the outer portion of the operating system kernel and the second outer portion of the operating system kernel each comprises a file systems unit and a device driver unit.

7. The computing device of claim 1, wherein the outer region of the kernel space and the inner region of the kernel space are divided by nested page tables.

8. A system, comprising a processor to:
load an inner portion of an operating system kernel in an inner region of a kernel space, wherein the inner portion has direct access to hardware of the system;
load a set of outer portions of the operating system kernel in an outer region of the kernel space, wherein the set of outer portions includes all other components of the operating system kernel not included in the inner portion;
execute a service in a container of a set of containers in a user space, wherein each container is communicatively coupled with an outer portion of the set of outer portions of the operating system kernel, and wherein each container is divided from the inner portion of the operating system kernel and each container is isolated from all other containers in the set of containers; and
in response to detecting an attack on a container, a corresponding service, or a corresponding outer portion of the operating system kernel, take remedial action on the attacked container, service, or outer portion of the operating system kernel, wherein the other containers, services, and outer portions of the operating system kernel are unaffected by the remedial action.

9. The system of claim 8, wherein the outer region of the kernel space and the inner region of the kernel space are divided by nested page tables.

10. The system of claim 8, wherein:
the inner portion of the operating system kernel comprises a memory management unit, a process management unit, and architecture specific code; and
each outer portion of the set of outer portions of the operating system kernel comprises a file systems unit and a device driver unit.

11. A method, comprising:
loading, by a computing device, an inner portion of an operating system kernel in an inner region of a kernel space, wherein the inner portion has direct access to hardware of the computing device;
loading, by the computing device, a set of outer portions of the operating system kernel in an outer region of the kernel space, wherein the set of outer portions includes all other components of the operating system kernel not included in the inner portion;
executing, by the computing device, a service in a container of a set of containers in a user space, wherein each container is communicatively coupled with an outer portion of the set of outer portions of the operating system kernel, and wherein each container is divided from the inner portion of the operating system kernel and each container is isolated from all other containers in the set of containers; and
in response to detecting an attack on a container, a corresponding service, or a corresponding outer portion of the operating system kernel, taking, by the computing device, remedial action on the attacked container, service, or outer portion of the operating system kernel, wherein the other containers, services, and outer portions of the operating system kernel are unaffected by the remedial action.

12. The method of claim 11, wherein the outer region of the kernel space and the inner region of the kernel space are divided by nested page tables.

13. The method of claim 11, wherein:
the inner portion of the operating system kernel comprises a memory management unit, a process management unit, and architecture specific code; and
each outer portion of the set of outer portions of the operating system kernel comprises a file systems unit and a device driver unit.

* * * * *